Oct. 26, 1965   G. A. SCOTT   3,213,847
RANGE CONSTRUCTION
Filed Feb. 17, 1964

INVENTOR.
GEORGE A. SCOTT
BY Richard L. Caslin
HIS ATTORNEY

United States Patent Office 3,213,847
Patented Oct. 26, 1965

3,213,847
RANGE CONSTRUCTION
George A. Scott, Jeffersontown, Ky., assignor to General Electric Company, a corporation of New York
Filed Feb. 17, 1964, Ser. No. 345,362
5 Claims. (Cl. 126—37)

The present invention relates to the art of ranges for cooking food and particularly domestic ranges, although it may also be used in the construction of built-in wall ovens.

The fairly recent introduction of one-piece built-in range of the type disclosed in the United States patent of William A. Nielsen 3,051,160, which is assigned to the General Electric Company, assignee of the present invention, spear-headed a new line of cooking appliances by the entire industry. Once this type of range is mounted in the kitchen counter the only portions of the range that are visible are the top cooking surface and the front of the oven that is suspended therebeneath. Accordingly, the two side walls of the range, the back wall and the bottom wall are not provided with appearance finishes. This installation change in the design of ranges has made it possible to redesign the range completely in order to substitute more effective materials which perform dual functions thereby using only a minimum number of parts.

The principal object of the present invention is to provide a domestic range with improved semi-rigid means for both insulating and isolating the oven liner from the range body, as well as eliminating non-essential metal panels that have been used heretofore in supporting the oven insulation.

A further object of the present invention is to provide an oven design of the class described with novel means for capturing the oven liner within the oven insulation so as to prevent relative movement therebetween.

A further object of the present invention is to provide an oven construction with a self-supporting semi-rigid insulating material that may be compressed around the oven liner with tension means thereby eliminating the necessity of a metal cabinet structure for the oven.

A further object of the present invention is to provide a cooking appliance of the class described with a slab of high temperature insulating material in one or more pieces which may be fastened to the outer surface of the oven liner for capturing the oven liner therein and preventing relative movement therebetween.

A still further object of the present invention is to provide a cooking appliance of the class described with a molded slab of insulating material in one or more pieces which covers the outer surface of the oven liner and is self-supporting so as to eliminate the necessity for a housing or cabinet structure.

The present invention, in accordance with one form thereof, is embodied in a cooking appliance comprising a cooktop and an oven suspended therebeneath. The oven is formed by an oven liner and a front-opening access door. Heating means are provided for the oven and a semi-rigid insulating material surrounds the outside of the oven liner. A compression force is applied to the insulation for capturing the oven liner therein and preventing relative movement therebetween. A yoke encircles the front portion of the oven liner and it includes means for supporting the oven door therefrom. A metal box covers at least a portion of the insulation at the back portion of the oven liner, and this box serves to house a connecting means between the oven heating means and the source of power to be supplied to the range. The cooktop is positioned over the oven and fastened to both the front yoke and the rear box. Also, connecting means are supplied at the bottom of the oven for joining the front yoke and the rear box.

My invention will be better understood from the following description taken in conjunction with the accompanying drawing and its scope will be pointed out in the appended claims.

Figure 2:
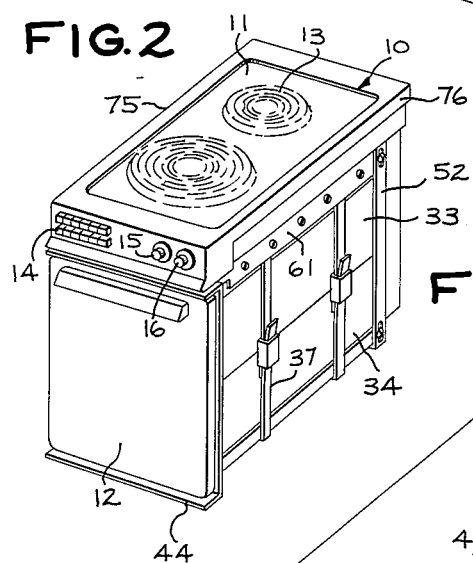
FIGURE 2 is an isometric view of the range of FIGURE 1 removed completely from the cabinet.

Turning now to a consideration of the drawing and in particular to FIGURE 2 there is shown a one-piece built-in range 10 comprising an upper cooktop 11 and a lower baking oven 12 positioned therebeneath. The cooktop 11 includes a plurality of surface heating means 13 which may be represented by either electrical surface heating elements or gas burners although only electrical elements are shown. Suitable selector switches 14 are mounted on the front edge of the cooktop 11 for controlling the operation of the surface heating means 13. Also mounted on this front edge of the cooktop are an oven selector switch 15 and an oven thermostat 16.

Figure 3:
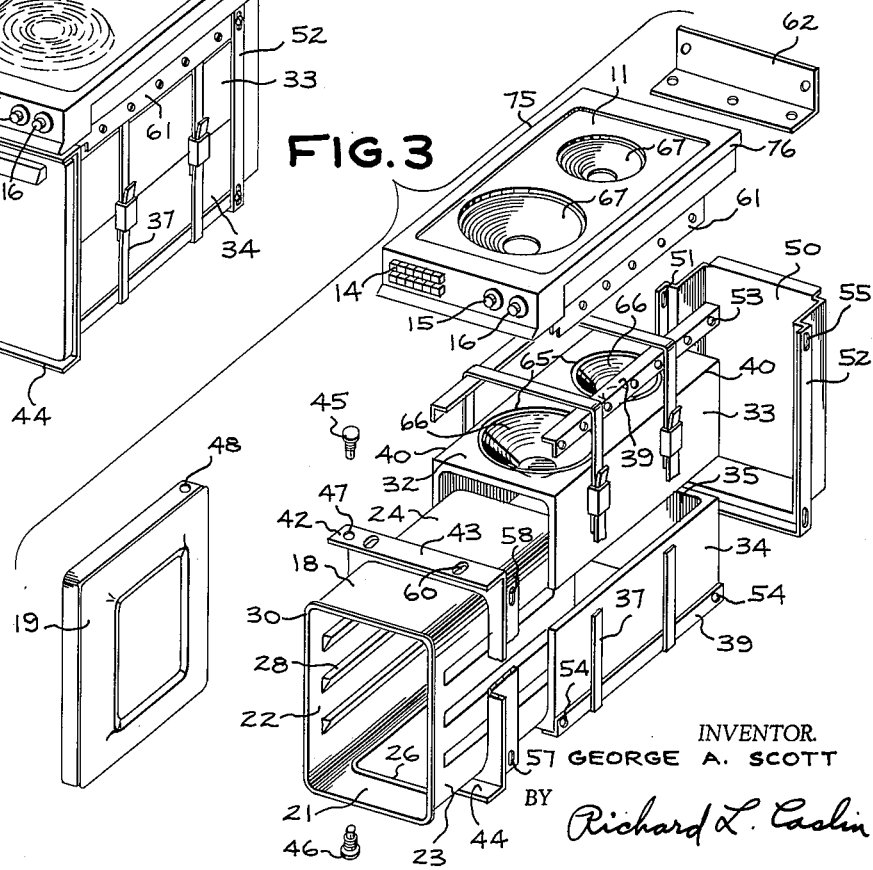
FIGURE 3 is an exploded view of the range of FIGURE 2 showing in detail the various elements which combine to form the range construction of the present invention.

As best seen in FIGURE 3, the oven 12 is formed by a box-like oven liner 18 and a front-opening access door 19. The oven liner has a bottom wall 21, opposite side walls 22 and 23, a top wall 24 and a back wall (not shown). An electric range is illustrated in the drawing, hence the lower portion of the oven cavity is provided with an electrical resistance type bake unit 26 in the form of a metal-sheathed tubular heater of looped design which is adapted to be fastened to the back wall of the oven liner for connection to power lead wires (not shown) that join the bake unit 26 to a terminal block (not shown) that is adapted to be energized by a power cable that would be connected to the range. Moreover, there would be an upper broil unit (not shown) located just beneath the upper wall 24 of the oven liner 18 as is conventional in this art. Shelf-supporting embossments 28 are vertically spaced on the opposite side walls 22 and 23 of the oven liner to form an adjustable means for supporting food-carrying shelves or racks (not shown) within the oven cavity. The front edge of the oven liner 18 is provided with an outwardly disposed peripheral flange 30 as is conventional in this art.

Means have been devised for improving the thermal insulating and isolating of the oven liner 18 from the cooktop 11 as well as from the exterior of the range, and these changes present an opportunity for eliminating a large amount of non-essential metal parts. Also, the new design will provide cooler operating temperatures for both the cooktop and front of the range as well as adding less heat to the kitchen during the operation of the oven. The conventional high temperature insulating material used for cooking appliances is fiberglass in the form of rather thick batts or blankets of loosely matted fibrous material. Such fiberglass blankets are not self-supporting and thus they require a surrounding metal cabinet or body structure which both complicates the design, increases the cost and increases the conductive heat losses.

Instead of the fiberglass material in loosely matted form, semi-rigid or rigid insulating material 32 in molded or slab form has been applied in a manner to cover the outer surface of the oven liner 18. The form of the invention that is illustrated in FIGURE 3 is the molded form where the insulation 32 is molded or pre-cast into two parts 33 and 34 respectively which, when they are combined, form a box-like container that fits snugly over the oven liner 18. The insulation 32 is divided along a horizontal plane that cuts through the center of the oven liner thereby forming the two separate parts 33 and 34 which are identical in shape, but the top part 33 is inverted over the bottom part 34. Notice that the molded insulation is provided with a back wall 35 to insure that the back wall of the oven liner is properly insulated. Instead of using this molded form, slabs or flat sheets of insulation could be utilized to cover the outer surface of the individual walls of the oven liner. Such slabs could have interlocking corner construction or mechanical fastening means at the abutting edges for ease of assembly.

A partial list of acceptable semi-rigid or rigid material capable of withstanding the temperature encountered would include fibrous glass that is molded with a high temperature binder, carbonate of magnesia, laminated asbestos felt, hydrous calcium silicate, foamed lime glass and potassium titanate. In addition, suitable binders are sodium silicate, bonding clays, and portland cement, while usable fillers would include asbestos, vermiculite, fibrous glass and hollow glass or ceramic beads. Moreover, some high temperature urethanes and phenolics could be used either as a foamed insulation or as a binder for the above fillers.

The preferred embodiment of the present invention utilizes banding straps 37 which encircle the molded insulation 32 and are tightened to hold the insulation firmly against the oven liner so that the oven liner is captured within the insulation thereby preventing relative movement therebetween. Because of the tension force applied to the banding straps, it is well to utilize angle members 39 to protect the four corner edges of the insulation which are identified as edges 40 and extend from front to back of the oven. These angle members 39 serve to distribute the compressive force uniformly and prevent the banding straps 37 from penetrating or digging into the insulation and possibly loosening the hold of the straps on the insulation.

Prior to applying the insulation 32 to the oven liner 18, a yoke member 42 seen in FIGURE 3 is assembled over the oven liner to bear against the back surface of the flange 30 at the front edge of the oven liner. Then the insulation 32 is applied and the banding straps 37 tightened down to capture the yoke 42 on the oven liner and the oven liner within the insulation. This yoke 42 is of rather thin gauge metal which has a restricted area of contact almost a line contact with the oven liner so as to reduce the conduction of heat from the oven liner to the outside of the range. The yoke also includes a forwardly-turned top flange 43 and a forwardly-turned bottom flange 44 so as to receive a swing-out oven door 19. This provides a hinging means by way of the pivot pins 45 and 46 which form a vertical pivotal axis when inserted through the pin openings 47 in the flanges and threaded into the pin openings 48 in the top and bottom edges of the door. It is quite possibe to eliminate the yoke flanges 43 and 44 and substitute a front-opening drop door in place of the vertically swinging door, where the drop door would be supported from the bottom angle members 39 and have the usual type of counter-balancing spring arrangements that are conventional in the oven art. In this event the yoke 42 would serve as a mere appearance cover over the front edge of the insulation.

Power must be supplied to the range whether it be by way of electrical cable or a gas supply line. Usually such power supplies are connected to the back of the range. In the case of an electric range, a terminal block (not shown) would be provided for connection with the leads of the power supply cable. Then lead wires (not shown) would be fed from the terminal block to the various control components such as the oven switch 15 and thermostat 16 and then would be directed to the heating elements such as the surface heating elements 13 and the bake unit 26 and broil unit within the oven. It is well to enclose this connection of the power supply to the heating means of the range, and this is provided by a metal box 50 which covers most of the insulation at the back wall of the oven. The box is provided with mating flanges 51 and 52 which are adapted to engage over the ends of the angle members 39 and to be attached therewith by suitable fasteners through openings 53 and 54 of the angle members. Notice that elongated openings 55 are formed in the flanges so as to provide a wide adjustment and always allow the connection between the box and the angle members. This has been found necessary because of the semi-rigidity of certain samples of the oven insulation 32 which may tend to compress slightly, depending upon the amount of tension applied to the banding straps 37.

The back surface of the yoke 42 is provided with vertical reinforcing flanges 57 on the two sides thereof. These flanges serve to reinforce the yoke as well as to provide a connecting means with the front end of the angle members 39. These flanges are also provided with vertically extending elongated slots 58 through which fastening screws extend into suitable openings 53 and 54 of the angle members.

After the angle members 39 are connected to both the yoke 42 and the rear box 50, the cooktop 11 is positioned over the oven and fastened in place by use of the elongated openings 60 in the top flange 43 of the yoke as well as the openings 53 in the two top angle members in cooperation with the side plates 61 at the bottom of the cooktop. Moreover, there is a closure plate 62 which fits in the back of the cooktop and closes the top opening in the rear box 50 as can be clearly understood from the illustration of FIGURE 2.

Another advantage of using the semi-rigid insulating material is that it may be pre-formed or indented as is shown at 65 in the top surface thereof undrelying the two heating elements 13. These indentations serve to center a dished drip pan 66 which would underlie the reflector pan 67 of the surface heating unit 13.

Figure 1:
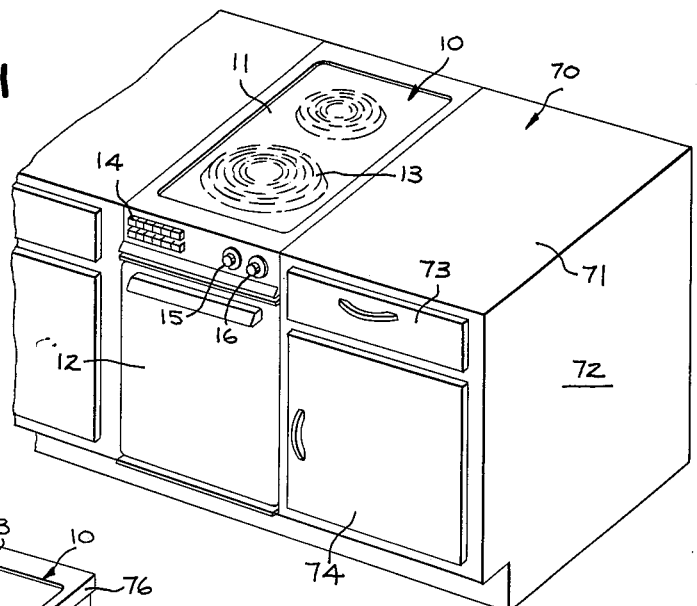
FIGURE 1 is an isometric view showing a portion of a kitchen counter cabinet having supported therein a one-piece built-in range embodying the present invention.

As to the means of supporting the range in the counter, attention is now directed to FIGURES 1 and 2. The kitchen counter cabinet is identified as element 70 having a countertop 71 and an underlying cabinet structure 72 which includes utensil drawers 73 and suitable storage shelves behind the cabinet doors 74. Both the counter top 71 and the front of the cabinet 72 is notched-out for receiving the one-piece built-in range 10 of the present invention. The opposite sides 75 and 76 of the cooktop are provided with overhanging ledges which are adapted to bear upon recessed runners (not shown) at the opposite side edges of the notched counter 71 so that the range may be mounted flush within the cabinet as shown in the manner of a drawer as it taught by the Nielsen Patent 3,051,160 as was mentioned previously.

It will be readily understood by those skilled in this art that while this invention has been illustrated as applied to a one-piece, built-in range it could also be incorporated in a free-standing range by adding a lower utensil drawer assembly to the lower angle members 39 to form a base on which the range would be supported.

Modifications of this invention will occur to those skilled in this art, therefore it is to be understood that this invention is not limited to the particular embodiments disclosed but that it is intended to cover all modifications which are within the true spirit and scope of this invention as claimed.

What I claim as a new and desire to secure by Letters Patent of the United States is:

1. A domestic range comprising a cooktop having a plurality of surface heating means and an oven located beneath said cooktop, the oven having a cooking cavity formed by a box-like oven liner and a front-opening access door, heating means for the cooking cavity, blocks of high temperature insulation covering the outer surface of the oven liner, and an angle member located on each of the horizontal corner edges of the insulation that extend from front to back of the oven liner, and banding straps encircling both the insulation and angle members and being tensioned to capture the oven liner within the insulation and prevent relative movement therebetween, a stationary yoke encircling the front portion of the oven liner means for supporting the oven door from the yoke, a metal box covering at least a portion of the insulation at the back wall of the oven liner, said box serving to house a connecting means between the oven heating means and a source of power to be supplied to the range, and fastening means joining the angle members to the yoke and rear box, the cooktop being positioned over the oven and fastened to at least the two topmost angle members.

2. A domestic range comprising a cooktop and an underlying oven, the oven being formed by a box-like oven liner and a front-opening door, a metal frame encircling the front portion of the oven liner for supporting the oven door therefrom, semi-rigid thermal insulating material surrounding the outside of the oven liner, reinforcing members located on the horizontal corner edges of the insulation, tension means encircling both the insulation and reinforcing members and capturing the oven liner within the insulation, a metal box covering the back wall of the range, the cooktop being positioned over the oven and fastened to both the front frame and the rear box, the reinforcing members at the bottom of the oven being joined to both the front frame and the rear box for spacing them apart.

3. A cooking apparatus comprising an upper cooktop and a lower baking oven positioned therebeneath, the oven having a cooking cavity formed by an oven liner and an access door, heating means for said cavity, a metal yoke encircling the front portion of the oven liner and providing supporting means for the oven door, semi-rigid slabs of thermal insulating material covering the outside of the oven liner, elongated strut members positioned on the horizontal corner edges of the insulation and extending from front to rear thereof, a rear box covering at least a portion of the back wall of the oven, the said strut members being connected between the metal yoke at the front of the oven and the rear box, the upper cooktop comprising a plurality of surface heating means and being assembled over the oven and connected to both the front yoke and rear box, and tension means encircling both the insulation and strut members for applying compressive forces to the insulation so as to capture the oven liner therein.

4. A one-piece built-in range adapted to be supported as a unit from the top surface of a counter structure which is provided with a notch in said surface extending through the front thereof and a communicating notch in the front surface of the counter to receive said range, said range comprising a cooktop having a plurality of surface heating means and an oven located under said cooktop, the oven having a cooking cavity formed by an oven liner and a front-opening access door, heating means for said cavity, a metal yoke encircling the front portion of the oven liner, molded blocks of thermal insulating material surrounding the outside surface of the oven liner, a metal box covering at least a portion of the rear portion of the oven, said box serving to house a connecting means between the oven heating means and a source of power to be supplied to range, reinforcing members positioned on the horizontal corner edges of the insulation, and tension straps completely encircling both the reinforcing members and the insulating block for holding the oven liner fixed therein, the cooktop being positioned over the oven and fastened to both the front yoke and the rear box, the reinforcing members at the bottom of the oven also being connected between the front yoke and the rear box for spacing them apart.

5. A domestic oven having a cooking cavity formed by an oven liner and a front-opening access door, heating means for said cooking cavity, the oven liner having a bottom wall, opposite side walls, a back wall, a top wall and an open front that is adapted to be closed by the access door, the front of the oven liner having an outturned peripheral flange, a yoke member encircling the front portion of the oven liner and engaging the back surface of the flange, and means for supporting the oven door from the yoke member, molded blocks of thermal insulation surrounding the outside surface of the oven liner, a metal box covering at least a portion of the insulation at the back portion of the oven liner, the horizontal corner edges of the insulation being fitted with elongated angle members that extend between the front yoke and rear box and are connected thereto, said box serving to house connecting means between the oven heating means and a source of power to be supplied to the range, and tension straps completely encircling both the angle members and the insulation and capturing the oven liner therebeneath.

References Cited by the Applicant
UNITED STATES PATENTS

| 2,116,669 | 5/38 | Dadson | 126—273 |
| 2,170,409 | 8/39 | Hoffman et al. | |
| 2,393,879 | 1/46 | Barnsteiner | 126—39 |
| 3,051,160 | 8/62 | Nielsen | 126—37 |

FOREIGN PATENTS 598,903   3/48   Great Britain.

FREDERICK L. MATTESON, Jr., *Primary Examiner.*

CHARLES J. MYHRE, *Examiner.*